United States Patent
Wells et al.

(10) Patent No.: US 6,728,893 B1
(45) Date of Patent: Apr. 27, 2004

(54) POWER MANAGEMENT SYSTEM FOR A RANDOM NUMBER GENERATOR

(75) Inventors: Steven E. Wells, El Dorado Hills, CA (US); David A. Ward, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/553,925

(22) Filed: Apr. 21, 2000

(51) Int. Cl.$^7$ ................................................. G06F 1/32
(52) U.S. Cl. ........................ 713/324; 713/300; 713/320
(58) Field of Search ............................... 713/300, 320, 713/322, 324, 340

(56) References Cited

U.S. PATENT DOCUMENTS

| | | | |
|---|---|---|---|
| 4,313,031 A | | 1/1982 | Widmer |
| 4,379,420 A | * | 4/1983 | Deutsch ...................... 114/345 |
| 4,810,975 A | | 3/1989 | Dias |
| 5,025,387 A | * | 6/1991 | Frane ......................... 713/322 |
| 5,251,165 A | | 10/1993 | James, III |
| 5,276,889 A | * | 1/1994 | Shiraishi et al. ............ 713/322 |
| 5,301,151 A | | 4/1994 | Wells et al. |
| 5,317,528 A | * | 5/1994 | Gofman ...................... 708/250 |
| 5,377,200 A | * | 12/1994 | Pedneau ..................... 714/733 |
| 5,603,036 A | | 2/1997 | Wells et al. |
| 5,696,977 A | | 12/1997 | Wells et al. |
| 5,706,218 A | | 1/1998 | Hoffman |
| 5,784,002 A | * | 7/1998 | Roehr ....................... 340/825.5 |
| 5,805,907 A | * | 9/1998 | Loper et al. ................ 713/300 |
| 5,966,313 A | | 10/1999 | Sakamoto |
| 6,046,616 A | | 4/2000 | Chan et al. |
| 6,064,223 A | * | 5/2000 | Lu et al. ....................... 326/21 |
| 6,233,531 B1 | * | 5/2001 | Klassen et al. ............... 702/80 |
| 6,280,045 B1 | * | 8/2001 | Anteby et al. .............. 362/103 |

FOREIGN PATENT DOCUMENTS

FR  2 802 661 A1  12/1999

OTHER PUBLICATIONS

Neve et al., "Smart Card Circuits in SOI Technology," 2000 IEEE International SOI Conference, Oct. 2, 2000, p. 48, New York, NY USA.
PCT Search Report, PCT/US01/10385, Dec. 6, 2001.

* cited by examiner

Primary Examiner—Thomas Lee
Assistant Examiner—Paul Yanchus, III
(74) Attorney, Agent, or Firm—Blakely, Sokoloff, Taylor & Zafman LLP

(57) ABSTRACT

A system and method for controlling power are described. A computer system including a memory module and a random number generator is monitored. The random number generator is enabled to generate and process random bits. The memory module is enabled to receive and store the random bits generated. The memory module is then disabled.

33 Claims, 7 Drawing Sheets

US 6,728,893 B1

POWER MANAGEMENT SYSTEM FOR A RANDOM NUMBER GENERATOR

FIELD OF THE INVENTION

The present invention relates generally to computer security and, more particularly, to a power management system for a random number generator.

BACKGROUND OF THE INVENTION

Random number generator circuits are used in a variety of electronic applications. One important application for random number generators is in the field of computer security where messages are encrypted and decrypted. Cryptography involves the transformation of data into a coded message that is sent to and decoded only by the intended recipient. Most common cryptographic techniques use ciphers (or "keys") used by the sender to encode the message, and by the receiver to decode the encoded message. Common cipher systems use either a single key to code and decode a message, or two keys, one to encode the message and the other to decode the message.

The keys used to encode and decode messages are binary data patterns against which a message is processed or filtered. Effective cipher systems require the use of keys that have a sufficiently high number of bits to make replication through brute force search strategies of a key nearly impossible. Furthermore, the data patterns comprising the keys must be sufficiently random so that their pattern or the patterns in the message encoded by the key cannot be predicted any better than chance guessing. Effective cryptographic systems thus require the use of high quality random number generators to ensure that the binary data within a message is transformed in a totally unpredictable manner.

Present known random number generators present certain disadvantages. One disadvantage relates to power consumption. Random number generators contain subsystems that require substantial amounts of energy, irrespective of their operational state. The large amount of energy consumed could create problems especially for handheld or portable devices.

DESCRIPTION OF THE DRAWINGS

The present invention is illustrated by way of example and not limitation in the figures of the accompanying drawings, in which like references indicate similar elements and in which.

DETAILED DESCRIPTION

A system and method for controlling power are described. According to embodiments described herein, a computer system including a memory module and a random number generator is monitored. The random number generator is enabled to generate and process random bits. The memory module is enabled to receive and store the random bits generated. The memory module is then disabled if it has reached a predetermined full capacity or after a predetermined number of clock signals generated by a clock generator within the computer system. In the following description, for purposes of explanation, numerous specific details are set forth in order to provide a thorough understanding of the present invention. It will be evident, however, to one skilled in the art that the present invention may be practiced without these specific details.

Figure 1:
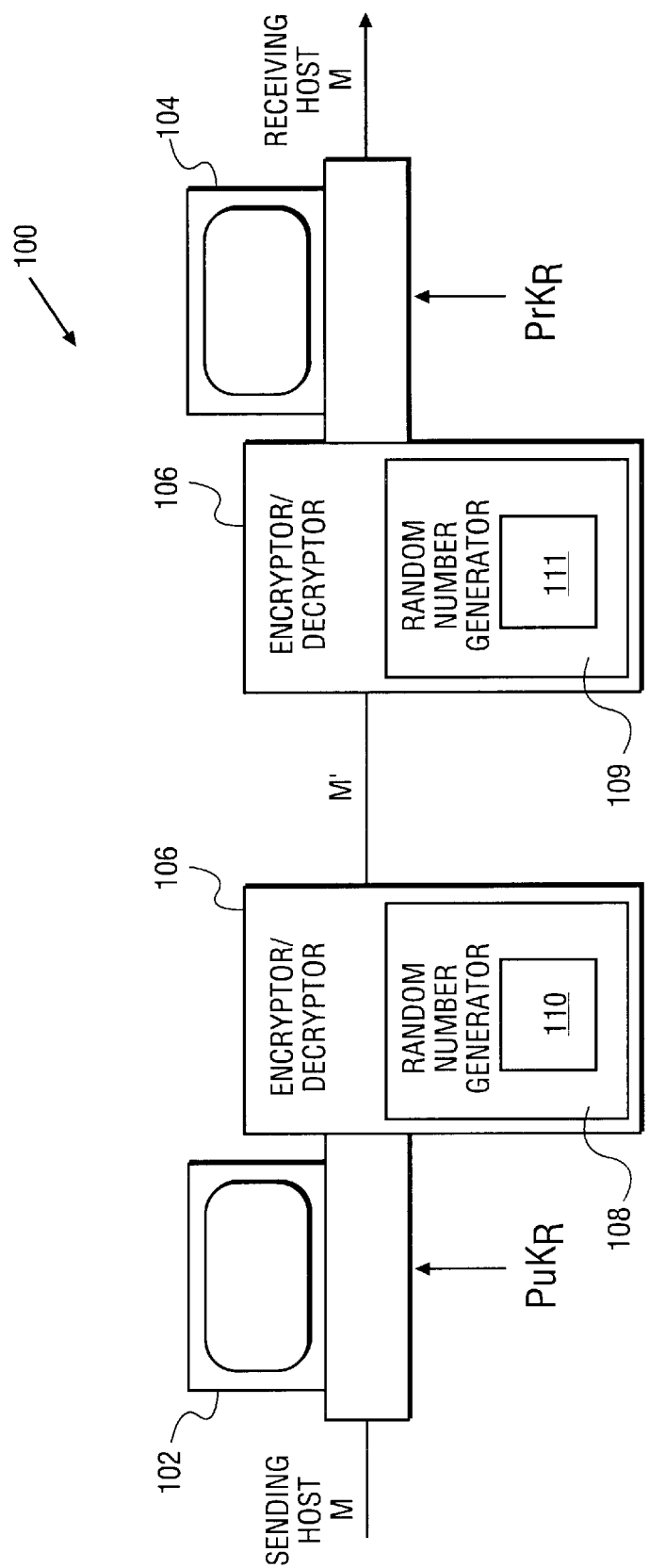
FIG. 1 is a block diagram of a computer network.

Random number generators are used to code and decode messages sent over a computer network. Random number generators are typically implemented in games, simulations, and other security applications. FIG. 1 is a block diagram of a computer network for transmitting such encrypted messages. In one embodiment, network 100 includes a sending host computer 102 coupled to a receiving host computer 104. Both the sending host computer 102 and the receiving host computer 104 contain network interface devices that provide the physical and logical connections between host computer systems and the network medium. Any number of potential entities may access network 100 and attempt to tamper with messages transmitted between host computers 102 and 104 within network 100. Therefore, both host computers also contain encryptor/decryptor circuits that perform various cryptographic functions for secure data communication. Sending host 102 includes encryptor/decryptor circuit 106, and receiving host 104 includes encryptor/decryptor circuit 107. The encryptor/decryptor circuits 106 and 107 include random number generators 108 and 109, each employing power management systems 110 and 111, respectively. Power management systems 110, 111 will be described in further detail below. The random number generators are used to generate the public/private key pairs $PuK_R$ and $PrK_R$ in public/private key systems.

Figure 2:
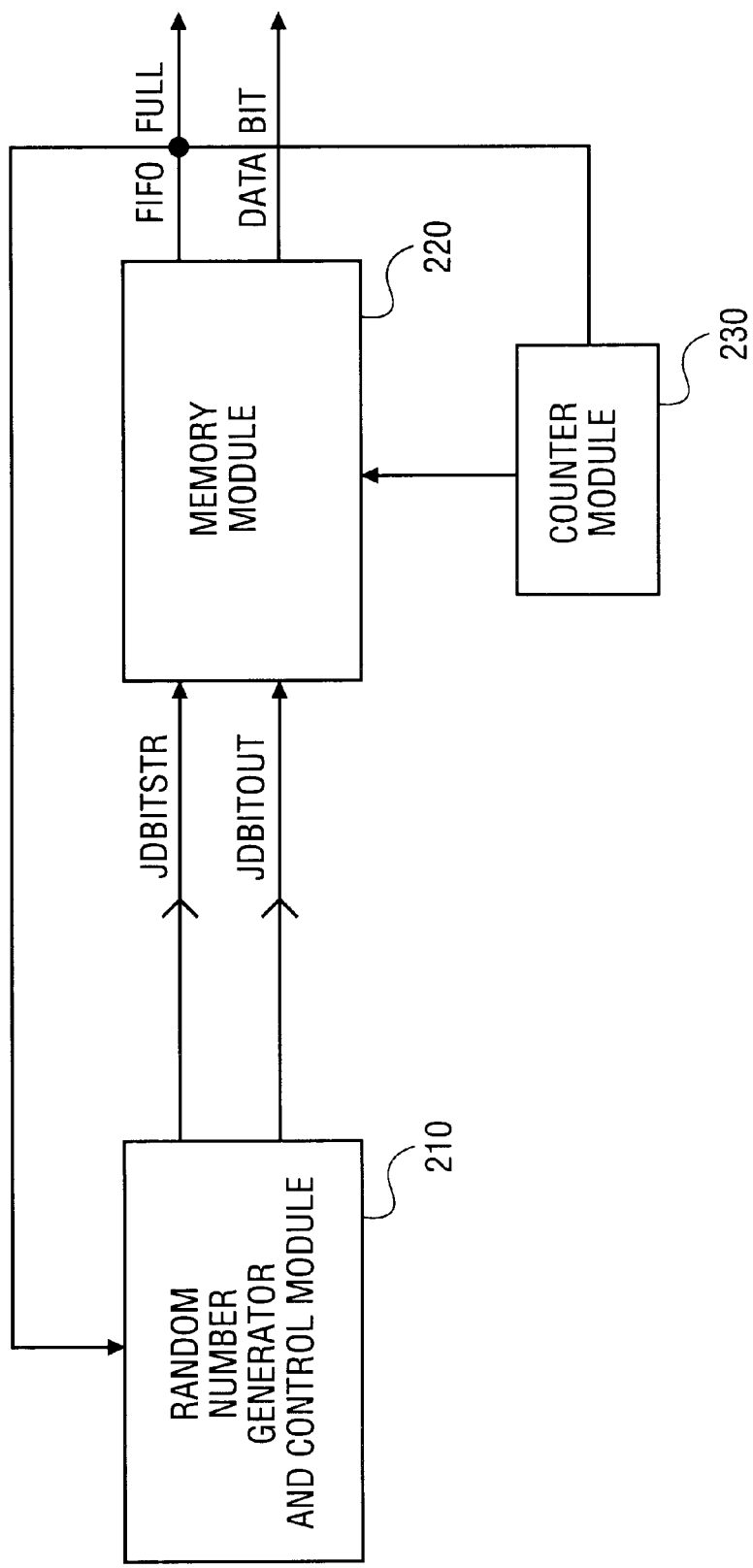
FIG. 2 is a block diagram of one embodiment of a power management system for a random number generator.

FIG. 2 is block diagram of one embodiment of a power management system for a random number generator. As illustrated in FIG. 2, random number generator 210 outputs a strobe signal JDBITSTR and a data signal JDBITOUT. Data signal JDBITOUT contains random bits generated by random number generator 210. Strobe signal JDBITSTR is a clock signal and is used to strobe a memory module 220 connected to the random number generator 210. Memory module 220 also receives data signal JDBITOUT and stores the generated random bits. In one embodiment, memory module 220 is a 32-bit First-In-First-Out (FIFO) memory.

Memory module 220 is further connected to a counter module 230 for counting the random bits and detecting when memory module 220 is empty or has reached a full capacity and its content needs to be drained. In one embodiment, counter module 230 is a 5-bit counter. In one embodiment, FIFO memory 220 contains 32 interconnected MS flip-flops and 8 n-channel pulldowns for allowing the counter module 230 to read its contents while continuing to load the generated random bits.

In one embodiment, once memory module 220 is full, counter module 230 and memory module 220 send a signal FIFO FULL to the random number generator 210 and the random bits stored within memory module 220 are subsequently available for access on a data bus (not shown). Alternatively, the random bits stored may be subsequently transmitted on the data bus using a DATA BIT data signal.

Figure 3:
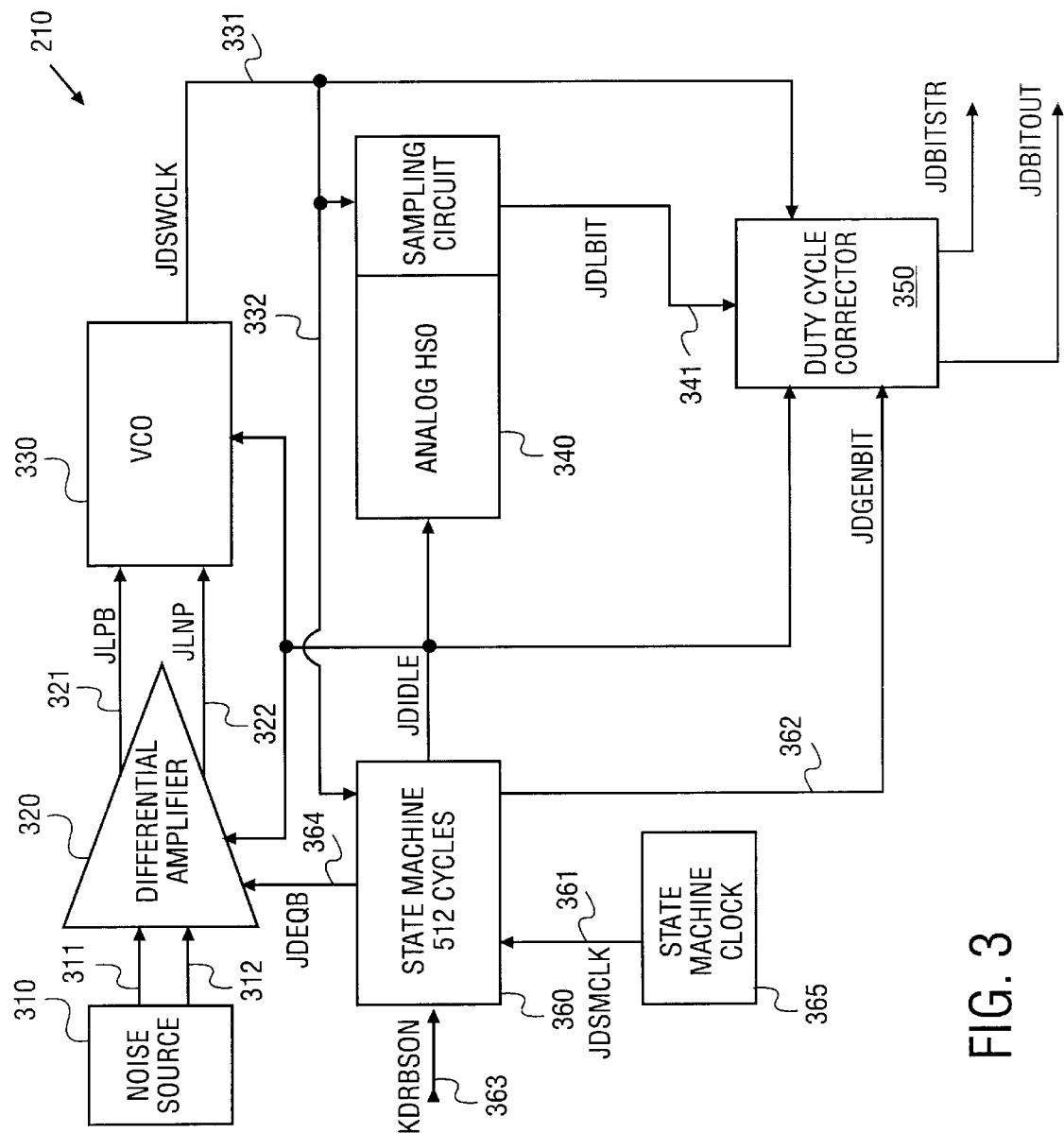
FIG. 3 is a diagram of a random number generator and a control module used with the power management system.

FIG. 3 is a diagram of one embodiment of a random number generator and a control module used with the power management system. In one embodiment, the components shown in the diagram are fabricated employing well known complementary-metal-oxide-semiconductor (CMOS) technology. As shown in FIG. 3, a noise source 310 outputs noise signals along lines 311 and 312 into a differential amplifier 320. In one embodiment, noise source 310 is a thermal noise source and is described in further detail in connection with FIG. 3a.

Figure 3A:
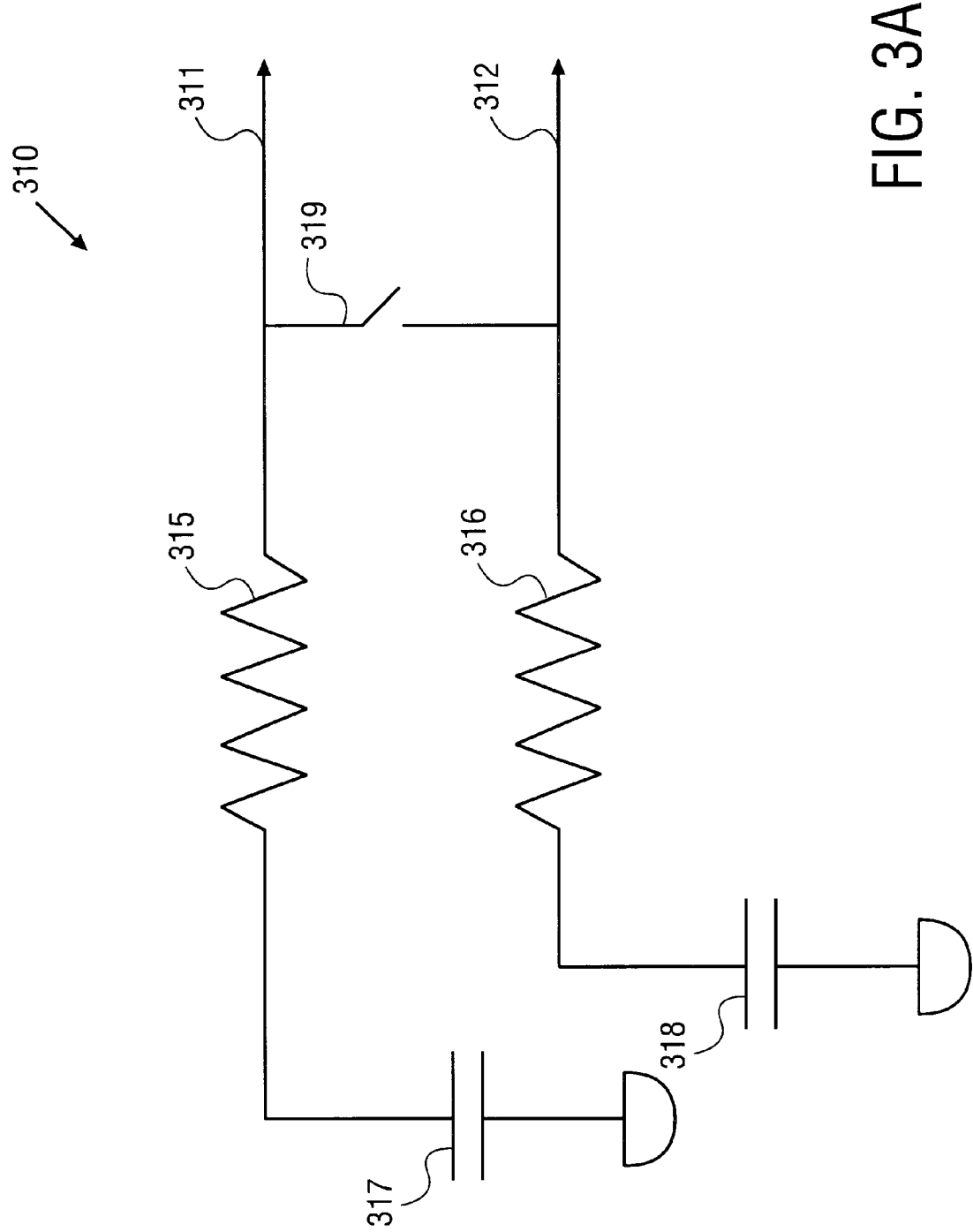
FIG. 3a is a circuit diagram of one embodiment of a noise source including an equalization module.

FIG. 3a is a circuit diagram of one embodiment of a noise source including an equalization module. Referring to FIG. 3a, in one embodiment, noise source 310 includes resistors 315 and 316 connected to high impedance nodes within the differential amplifier 320 shown in FIG. 3. Resistor 315 is connected to differential amplifier 320 through line 311, and resistor 316 is connected to the same amplifier 320 through line 312. In one embodiment, resistors 315 and 316 within noise source 310 are short-circuited together along line 319 and are connected to a predetermined reference voltage. Resistor 315 is further connected to a capacitor 317 and resistor 316 is further connected to a second capacitor 318, forming an equalization module, or equalization circuit, which provides the predetermined reference voltage along lines 311 and 312 into the differential amplifier 320. In one embodiment, the equalization circuit uses a control signal JDEQB sent along line 364 in FIG. 3 to equalize amplifier 320 and to provide the reference voltage to the amplifier 320.

Referring back to FIG. 3, the amplified signals JLPB and JLNB are transmitted to a voltage controlled oscillator (VCO) 330 along lines 321 and 322. In one embodiment, VCO 330 is a low frequency oscillator with its frequency controlled by signals JLPB and JLNB along lines 321 and 322. VCO 330 starts at the predetermined reference voltage provided by the equalization circuit connected to the differential amplifier 320.

VCO 330 outputs a clock signal JDSWCLK along line 331 and controls sampling of an analog high-speed oscillator (HSO) 340 provided with a sampling circuit. In one embodiment, the sampling circuit within the HSO 340 receives the clock signal JDSWCLK and generates a random bit signal JDLBIT along line 341.

A Duty Cycle Corrector (DCC) 350 receives the random bit signal JDLBIT and outputs the strobe signal JDBITSTR and the data signal JDBITOUT to the memory module 220 shown in FIG. 2. The DCC 350 also receives the clock signal JDSWCLK along line 331. In one embodiment, DCC 350 removes residual bias and enhances entropy of random bits transmitted along line 341, assuming the JDLBIT signal is a random input signal.

A control module, shown as State Machine 360, is provided to control the operation of the random number generator 210 and the memory module 220. State machine 360 further includes a state machine clock 365, which outputs clock signal JDSMCLK along line 361. In one embodiment, clock signal JDSMCLK is used to time all events controlled by state machine 360. Alternatively, state machine 360 also receives the clock signal JDSWCLK from VCO 330 along line 332. In one embodiment, the state machine clock 365 operates at a frequency of approximately 1 megahertz (MHz).

State machine 360 outputs an idle signal JDIDLE, which is received by the amplifier 320, the VCO 330, the HSO 340, and the DCC 350 within random number generator 210. In one embodiment, state machine 360 also outputs a blocking signal JDGENBIT, which is received by the DCC 350 along line 362, for controlling the operation of the memory module 220. Alternatively, the JDGENBIT signal may be transmitted directly to memory module 220.

At the same time, state machine 360 outputs the control signal JDEQB to amplifier 320 along line 364 for controlling the operation of the equalization circuit connected to the noise source 310. The control signal JDEQB controls the short-circuit along line 319 and the application of the reference voltage across the resistors 315 and 316.

Figure 4:
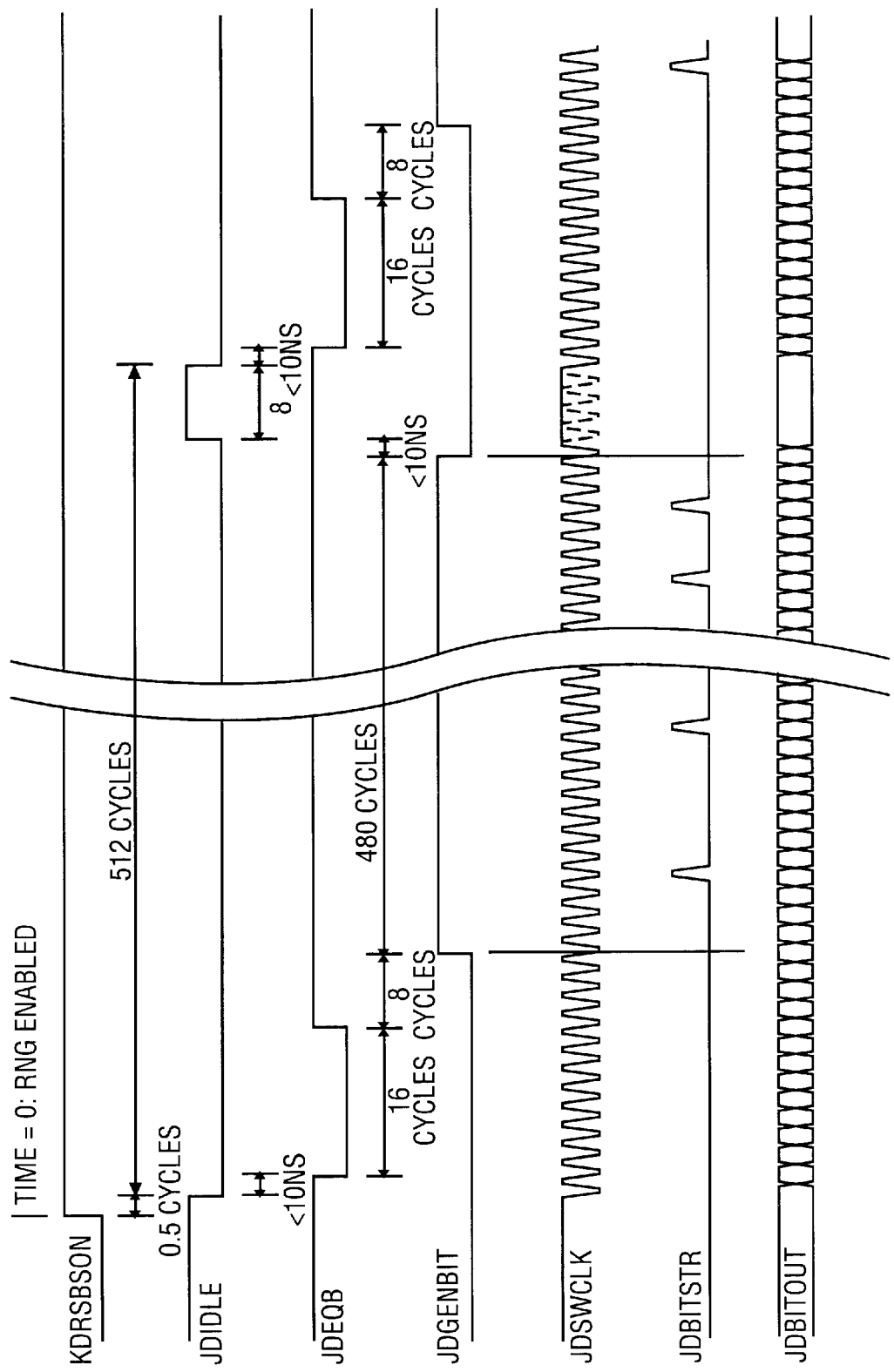
FIG. 4 is a timing diagram illustrating various signals used in the operation of the random number generator and the power management system.

The operation of the power management system will now be described in further detail and in connection with FIGS. 2, 3, and 4, wherein FIG. 4 is a timing diagram illustrating the various signals used in the operation of the power management system.

In one embodiment, it is assumed that random number generator 210 is disabled and does not generate random bits. The JDIDLE signal is high, keeping the components of random number generator 210 receiving JDIDLE in idle mode. The JDGENBIT signal is low, effectively blocking transmission and storage of random bits in memory module 220. A signal KDRBSON is asserted at time t=0 to a high value along line 363 to prompt the state machine 360 to monitor the random number generator 210 and the memory module 220.

Following the assertion of KDRBSON, state machine 360 deasserts JDIDLE to a low value and enables random number generator 210 to begin generating random bits. At the same time, state machine 360 enables the equalization circuit to equalize amplifier 320 by setting the JDEQB signal to a zero value. In one embodiment, JDIDLE is deasserted 0.5 cycles subsequent to the KDRBSON signal and JDEQB is set to a zero value within 10 nanoseconds from deassertion of JDIDLE. State machine 360 also continues to monitor memory module 220.

In one embodiment, JDIDLE goes low if state machine 360 detects assertion of a reset signal within the computer system. Alternatively, JDIDLE may be set to a low value if a signal indicating that memory module 220 is empty is asserted by memory module 220 or by counter module 230.

In one embodiment, the setting of JDEQB to a low level equalizes the amplifier 320 for a predetermined number of clock signals JDSMCLK, for example approximately 16 cycles on the low level of JDEQB. Alternatively, the amplifier 320 may be equalized for a predetermined number of clock signals JDSWCLK, for example 16 cycles on the low level of JDEQB. Alternatively, a different number of cycles may be selected to allow the amplifier 320 to equalize.

The predetermined reference voltage is applied across resistors 315 and 316, allowing capacitors 317 and 318 to get to the predetermined reference voltage. The reference voltage is then provided to amplifier 320.

Next, state machine 360 switches JDEQB to a high value, thereby disabling the equalization circuit and the application of the reference voltage across resistors 315 and 316. Subsequently, state machine 360 waits for an additional 8 cycles and sets blocking signal JDGENBIT from a low value to a high value, allowing DCC 350 to send random bits to the memory module 220. While JDGENBIT is low, random number generator 210 starts to generate random bits, but the output is discarded and random bits are not stored until JDGENBIT goes high.

When JDGENBIT goes high, memory module 220 is enabled and starts to collect and store the generated random bits. The counter module 230 monitors the level of memory module 220 and counts the stored random bits. In one embodiment, for a predetermined number of clock signals JDSMCLK, for example approximately 480 cycles on the high level of blocking signal JDGENBIT, random bits are stored in memory module 220. Alternatively, a different number of cycles may be selected to allow memory module 220 to collect random bits. In another embodiment, random bits may be stored in memory module 220 for a predetermined number of clock signals JDSWCLK, for example 480 cycles on the high level of blocking signal JDGENBIT.

In one embodiment, memory module 220 reaches a full capacity before or right at the expiration of the predetermined number of clock signals JDSMCLK. Alternatively, memory module 220 may reach a full capacity before or right at the expiration of the predetermined number of clock signals JDSWCLK.

At that time, counter module 230 and memory module 220 transmit the FIFO FULL signal to random number generator 210 and state machine 360, which disables memory module 220 by setting JDGENBIT back to a low value.

In an alternate embodiment, at the expiration of the predetermined number of clock signals JDSMCLK or, alternatively, JDSWCLK, memory module 220 may not reach its full capacity. Nevertheless, state machine 360 will set JDGENBIT to a low value and disable memory module 220.

DCC 350 receives the low JDGENBIT along line 362 and stops sending random bits on the JDBITOUT signal. In one embodiment, if memory module 220 is full, the stored random bits are subsequently accessed on the data bus (not shown). Alternatively, the stored random bits may be subsequently transmitted on the data bus using the DATA BIT data signal.

In one embodiment, state machine 360 subsequently switches JDIDLE to a high value within a predetermined period of time of less than 10 nanoseconds and disables all components of the random number generator 210 until the next random bit collection cycle.

Alternatively, state machine 360 may decide to keep JDIDLE low and the random number generator 210 active until the next random bit collection cycle. Random number generator 210 will continue to generate random bits, but the random bits will be discarded until JDGENBIT goes high again. Keeping the random number generator 210 active prevents startup anomalies in the output sequence that may be introduced during the periodic enabling procedure of the random number generator 210. In one embodiment, the decision may be implemented in software and a control bit may be set to enable continuous operation of the random number generator. Alternatively, a Flash CAM cell may be programmed to one of the two modes of operation, and a logic circuit may be provided to decode the programmed mode of operation and to instruct the random number generator to follow the programmed mode.

Figure 5:
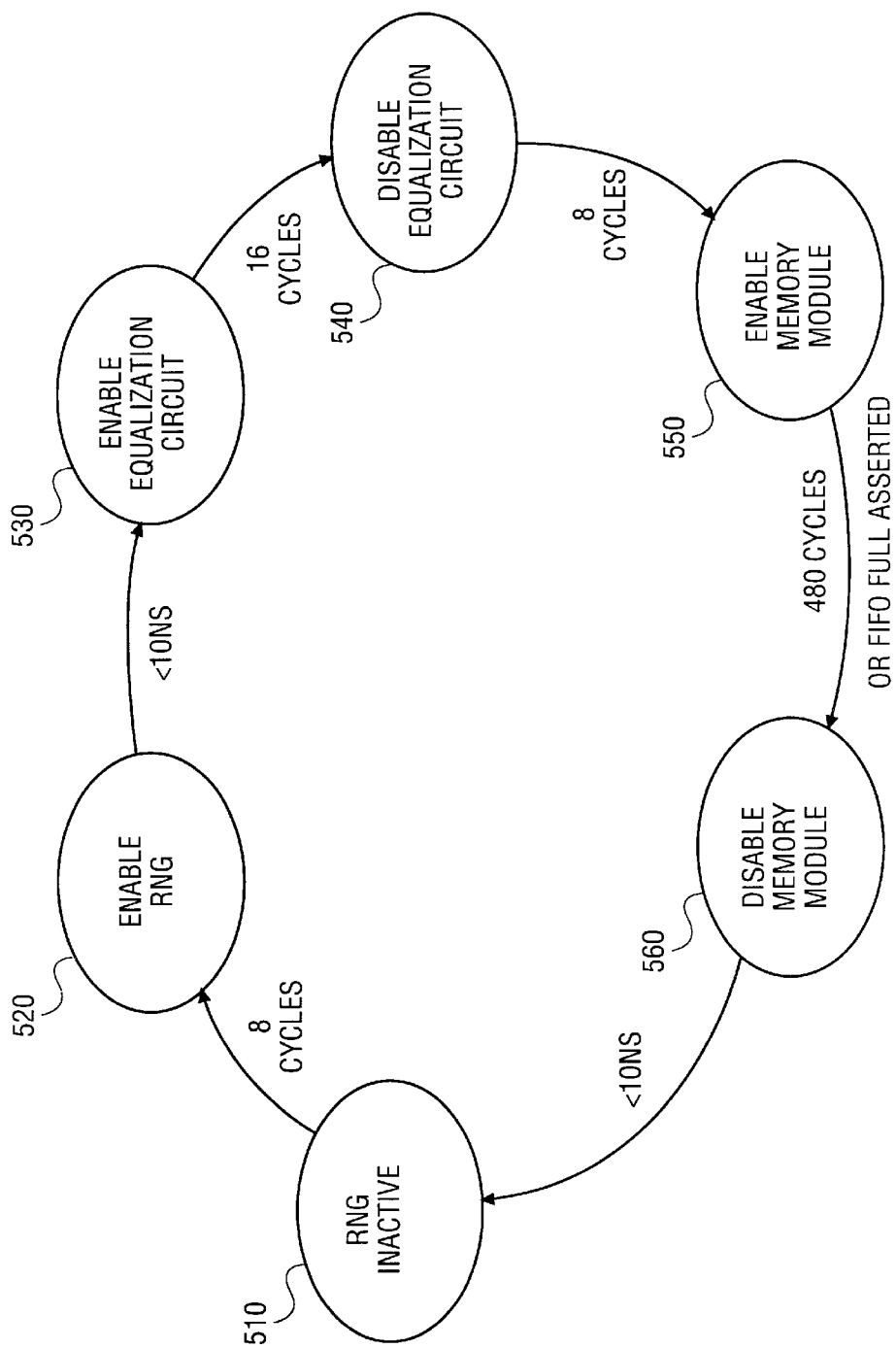
FIG. 5 is a state diagram illustrating the various states of the power management system.

FIG. 5 is a state diagram illustrating the various states of the power management system. As illustrated in FIG. 5, at state 510, the random number generator (RNG) is inactive and its components are in idle mode. At state 520, after the 8-cycle wait period, RNG is enabled and starts generating random bits.

At state 530, the equalization circuit is enabled. The amplifier is then equalized for 16 cycles, while the output of random bits from the RNG is discarded. Then, at state 540, the equalization circuit is disabled. After the 8-cycle wait period, the memory module is enabled at state 550 and the blocking signal is set from a low value to a high value. The memory module and the RNG are in active state and generated random bits are collected and stored for 480 cycles or until the memory module is full.

Finally, at state 560, the memory module is disabled at the expiration of the 480 cycles or if it reaches the predetermined full capacity and the FIFO FULL signal is asserted. If memory module is full, the stored random bits are then transmitted on the data bus when accessed.

In one embodiment, the RNG is then disabled and its components are returned to inactive status. Alternatively, the RNG may be kept active and the output of random bits discarded until the next enabling of the memory module.

Figure 6:
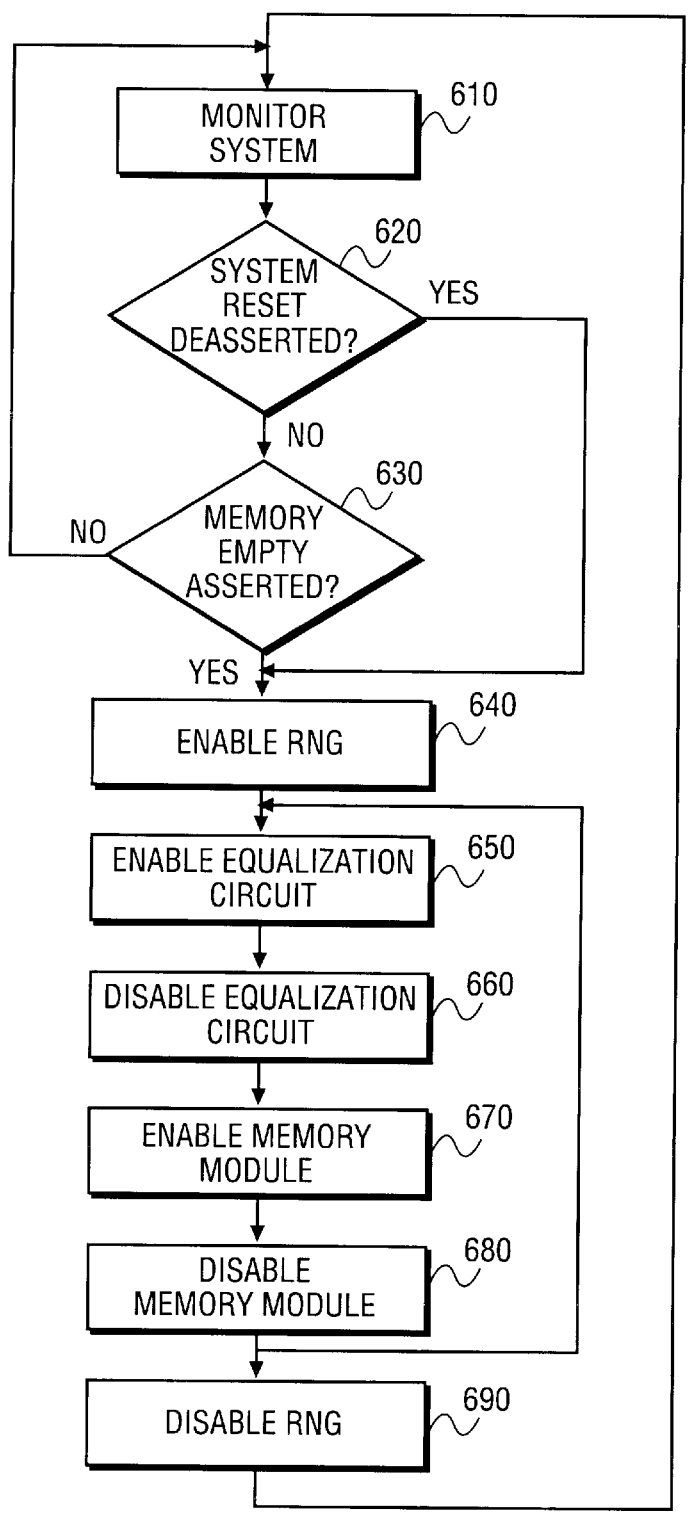
FIG. 6 is a flow diagram illustrating a method for controlling power using the power management system.

FIG. 6 is a flow diagram illustrating a method for controlling power using the power management system. As shown in FIG. 6, at processing block 610, the power management system is monitored, including the random number generator and the memory module.

At processing block 620, a decision is made whether a reset signal is asserted within the computer system. If no reset signal is asserted within the system, at processing block 630, a decision is made whether a signal indicating that memory module is empty is asserted within the system.

If the reset signal is asserted or if the signal indicating an empty memory module is asserted, the RNG is enabled at processing block 640. Otherwise, if no signal indicating empty memory module is asserted, monitoring of the random number generator and memory module continues at block 610.

At processing block 650, the equalization circuit is enabled. The differential amplifier is equalized for a predetermined number of clock signals and random bits generated by the RNG are discarded. Next, at processing block 660, the equalization circuit is disabled.

At processing block 670, memory module is enabled to allow collection and storage of random bits and the random bits are collected and stored in the memory module. At processing block 680, when memory module reaches a predetermined full capacity, or at the expiration of a predetermined number of clock signals, memory module is disabled.

Next, in one embodiment, processing blocks 650 through 680 are iteratively performed while the RNG continues to be enabled. Alternatively, at processing block 690, RNG is disabled and blocks 610 through 690 may be repeated.

It is to be understood that embodiments of this invention may be used as or to support software programs executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for controlling power comprising:
monitoring a computer system, said computer system including a memory module and a random number generator;

enabling said random number generator to generate and process a plurality of random bits while the memory module is disabled, said enabling said random number generator including, enabling an equalization module within said random number generator for a predetermined number of clock signals to provide a predetermined reference voltage to said random number generator, and disabling said equalization module after said predetermined number of clock signals;

enabling said memory module to receive and store said plurality of random bits; and disabling said memory module.

2. The method according to claim 1, further comprising disabling said random number generator to stop generating said plurality of random bits.

3. The method according to claim 1, wherein said disabling further comprises disabling said memory module if said memory module has reached a predetermined full capacity.

4. The method according to claim 1, wherein said disabling further comprises disabling said memory module after a predetermined number of clock signals generated by a clock generator within said computer system.

5. The method according to claim 1, wherein enabling said random number generator further comprises detecting assertion of a reset signal within said computer system.

6. The method according to claim 1, wherein enabling said random number generator further comprises detecting assertion of a signal transmitted to indicate that said memory module is empty.

7. The method according to claim 1, wherein enabling said memory module further comprises:

collecting at least one random bit generated during said predetermined number of clock signals; and discarding said at least one random bit.

8. The method according to claim 3, wherein disabling said memory module further comprises:

counting said plurality of random bits received and stored within said memory module; and setting a blocking signal within said computer system from an initial value to a predetermined value if said memory module has reached said predetermined full capacity.

9. The method according to claim 4, wherein disabling said memory module further comprises:

counting said plurality of random bits received and stored within said memory module; and setting a blocking signal within said computer system from an initial value to a predetermined value after said predetermined number of clock signals.

10. The method according to claim 8, wherein enabling said memory module further comprises:

outputting said plurality of random bits stored within said memory module; and setting said blocking signal within said computer system to said initial value.

11. The method according to claim 1, wherein enabling said memory module further comprises prompting said memory module to store said plurality of random bits after a predetermined number of clock signals provided by a clock generator within said computer system.

12. An apparatus for controlling power in a computer system having a random number generator, said apparatus comprising:

a memory module coupled to said random number generator for receiving and storing a plurality of random bits generated by said random number generator;

a counter module coupled to said memory module for counting said plurality of random bits received and stored within said memory module, said control module enabling an equalization module within said random number generator for a predetermined number of clock signals to provide a predetermined reference voltage to said random number generator and disabling said equalization module after said predetermined number of clock signals; and a control module coupled to said memory module and said counter module for selectively enabling and disabling said memory module and said random number generator.

13. The apparatus according to claim 12, further comprising a clock generator coupled to said control module for generating a predetermined number of clock signals within said computer system.

14. The apparatus according to claim 12, wherein said control module further disables said memory module if said memory module has reached a predetermined full capacity.

15. The apparatus according to claim 12, wherein said control module further disables said memory module after a predetermined number of clock signals generated by a clock generator within said computer system.

16. The apparatus according to claim 12, wherein said control module further detects assertion of a reset signal within said computer system and enables said random number generator to generate said plurality of random bits.

17. The apparatus according to claim 12, wherein said control module further detects assertion of a signal transmitted to indicate that said memory module is empty and enables said random number generator to generate said plurality of random bits.

18. The apparatus according to claim 12, wherein said control module further enables said memory module to receive and store said plurality of random bits after at least one random bit generated during said predetermined number of clock signals is collected and discarded.

19. The apparatus according to claim 14, wherein said control module further disables said memory module by setting a blocking signal within said computer system from an initial value to a predetermined value if said memory module has reached said predetermined full capacity.

20. The apparatus according to claim 15, wherein said control module further disables said memory module by setting a blocking signal within said computer system from an initial value to a predetermined value after said predetermined number of clock signals.

21. The apparatus according to claim 19, wherein said control module enables said memory module by outputting said plurality of random bits stored within said memory module and setting said blocking signal within said computer system to said initial value.

22. The apparatus according to claim 12, wherein said control module enables said memory module by prompting said memory module to store said plurality of random bits after a predetermined number of clock signals provided by a clock generator within said computer system.

23. A computer readable medium containing executable instructions which, when executed in a processing system, cause said system to perform a method for controlling power comprising:

monitoring a computer system, said computer system including a memory module and a random number generator;

enabling said random number generator to generate and process a plurality of random bits while the memory module is disabled, said enabling said random number generator including, enabling an equalization module within said random number generator for a predetermined number of clock signals to provide a predetermined reference voltage to said random number generator, and disabling said equalization module after said predetermined number of clock signals;

enabling said memory module to receive and store said plurality of random bits; and disabling said memory module.

24. The computer readable medium according to claim 23, wherein said method further comprises disabling said random number generator to stop generating said plurality of random bits.

25. The computer readable medium according to claim 23, wherein said disabling further comprises disabling said memory module if said memory module has reached a predetermined full capacity.

26. The computer readable medium according to claim 23, wherein said disabling further comprises disabling said memory module after a predetermined number of clock signals: generated by a clock generator within said computer system.

27. The computer readable medium according to claim 23, wherein enabling said random number generator further comprises detecting assertion of a reset signal within said computer system.

28. The computer readable medium according to claim 23, wherein enabling said random number generator further comprises detecting assertion of a signal transmitted to indicate that said memory module is empty.

29. The computer readable medium according to claim 23, wherein enabling said memory module further comprises:

collecting at least one random bit generated during said predetermined number of clock signals; and discarding said at least one random bit.

30. The computer readable medium according to claim 25, wherein disabling said memory module further comprises:

counting said plurality of random bits received and stored within said memory module; and setting a blocking signal within said computer system from an initial value to a predetermined value if said memory module has reached said predetermined full capacity.

31. The computer readable medium according to claim 26, wherein disabling said memory module further comprises:

counting said plurality of random bits received and stored within said memory module; and setting a blocking signal within said computer system from an initial value to a predetermined value after said predetermined number of clock signals.

32. The computer readable medium according to claim 30, wherein enabling said memory module further comprises:

outputting said plurality of random bits stored within said memory module; and setting said blocking signal within said computer system to said initial value.

33. The computer readable medium according to claim 23, wherein enabling said memory module further comprises prompting said memory module to store said plurality of random bits after a predetermined number of clock signals provided by a clock generator within said computer system.

* * * * *